H. LANDSIEDEL.
RECORDING MACHINE.
APPLICATION FILED APR. 4, 1913.
1,167,416.
Patented Jan. 11, 1916.
3 SHEETS—SHEET 1.
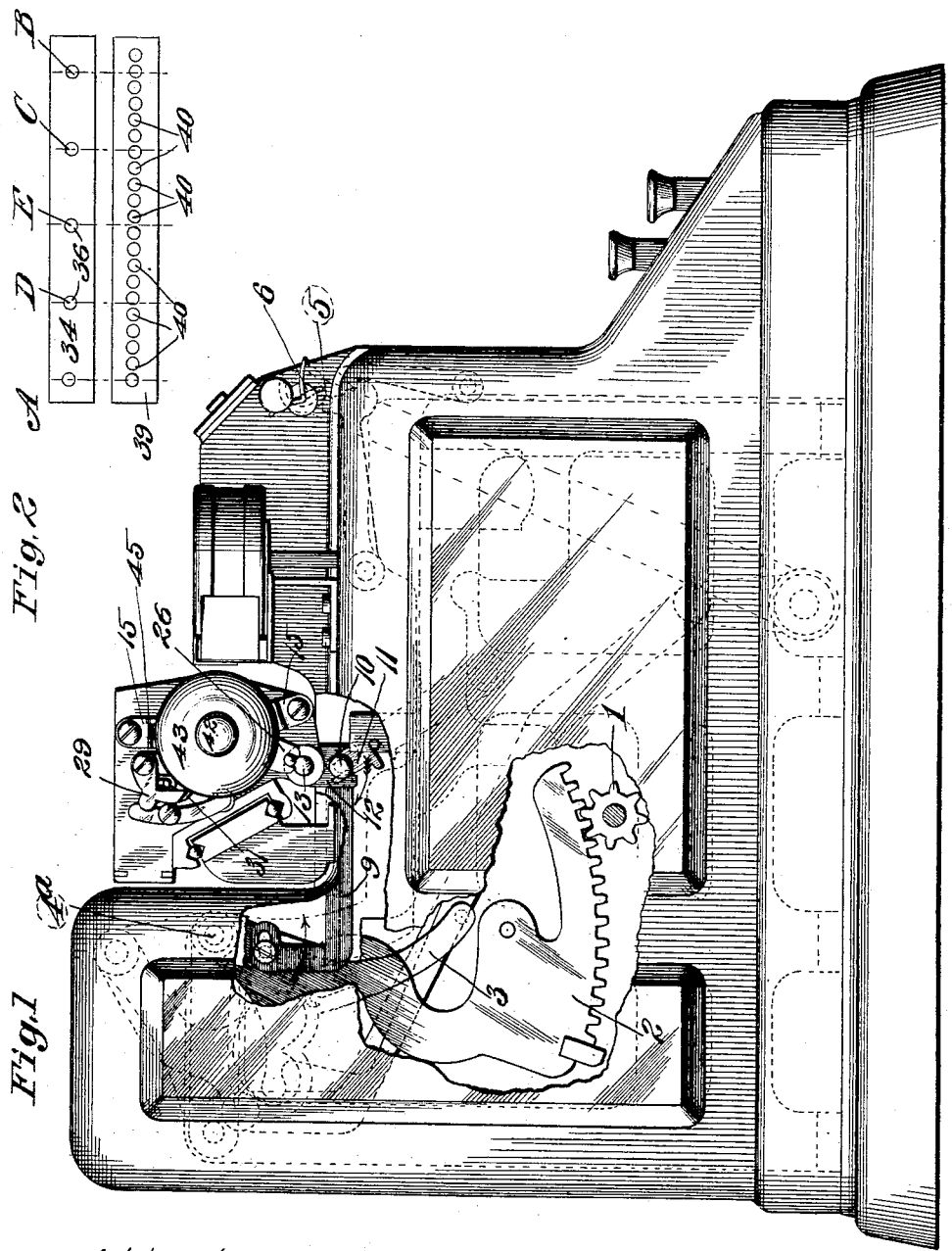
Attest:
Wm H Scott
R. M. Lawrence
Inventor:
Harry Landsiedel,
by J. D. Rippey atty.

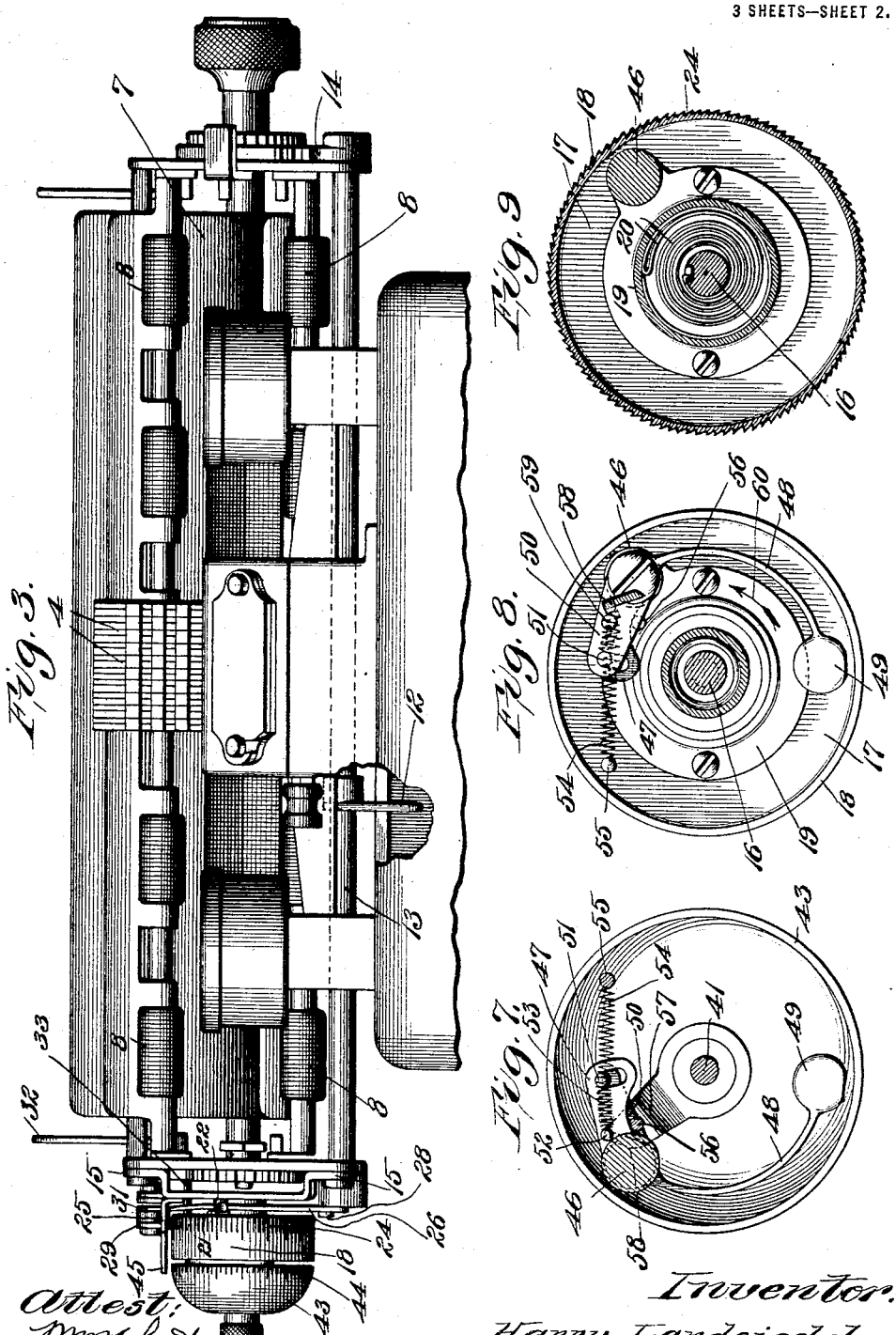

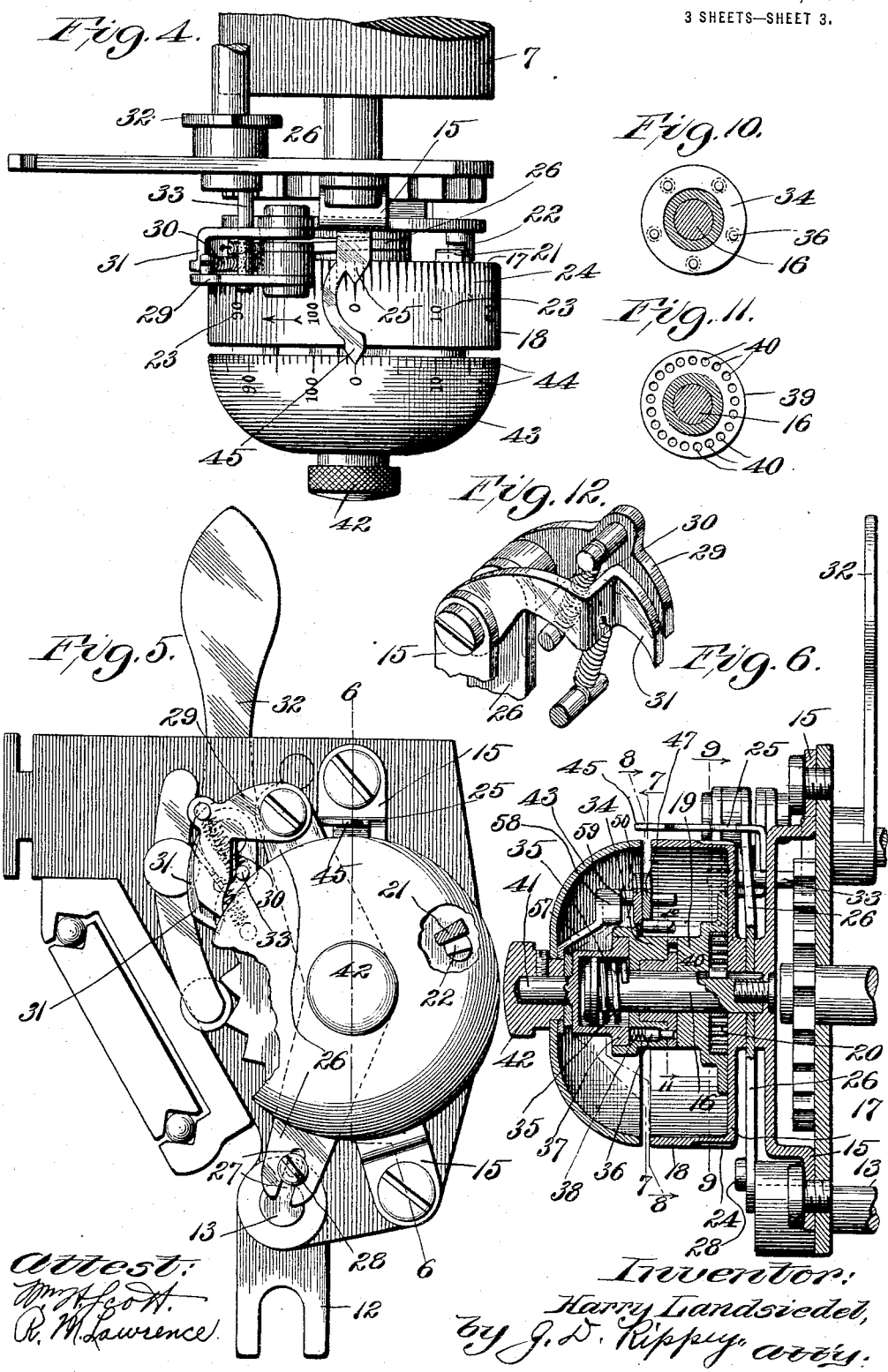

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

RECORDING-MACHINE.

1,167,416.                    Specification of Letters Patent.       Patented Jan. 11, 1916.

Application filed April 4, 1913. Serial No. 758,850.

*To all whom it may concern:*

Be it known that I, HARRY LANDSIEDEL, a citizen of the United States, residing at Poplar Bluff, Butler county, Missouri, have invented a new and useful Recording-Machine, of which the following is a specification.

This invention relates to recording machines of the type which include paper supports for moving paper in line spacing, such, for instance, as type writing machines adding and listing machines, and other machines in which paper is moved in line spacing operations.

In the accompanying drawings I have illustrated the present embodiment of my invention mounted upon an adding and listing machine of the well known Dalton type, though it will be understood that the invention may, with equal advantage, be used upon or in connection with any of the commercial adding and listing machines, or with typewriting machine.

An object of the invention is to provide a device or mechanism operable incidentally to the movement of the paper in line spacing to register or indicate the number of line spaces through which the paper has been or may be moved, and at a predetermined time to operate a signal whereby it will be directed to the attention of the operator that a desired predetermined number of lines have been printed, whether the lines are in the form of individual items or numbers listed by the adding machine or in the form of complete lines extending across a wider sheet of paper.

In connection with an adding machine the device is operable to indicate the number of items which have been added, whether or not the items are listed upon the paper, so that if the recording mechanism be disabled or rendered inoperative, the number of items added within the adding mechanism may be known at any desired time.

In the particular embodiment shown the device includes a support, and connections for actuating said support incidentally to movement of the paper in line spacing when records are made, said connections also being operative to actuate said support when a number is added whether or not a record is produced, in combination with a dial containing a numeral scale corresponding to the movements of the paper in line spacing, and corresponding to the operation of the adding mechanism independently of the recording mechanism, settable means for latching the dial in any desired relation to the support whereby the number of movements of the support may be determined at any time.

Another object is to provide a signal, with provision for operating the signal when a predetermined number of items have been added in the adding mechanism, or for operating the signal when the paper is moved through a predetermined number of line spaces, for instance.

Another object is to provide an improved combination of elements operable to indicate the number of items added, or the number of line spaces through which the paper has been moved, in combination with a novel form of latching means whereby the elements may be held in any desired relation to each other.

With the foregoing and other objects in view I have illustrated one form of my invention in the accompanying drawings in which—

Figure 1 is a side elevation of a Dalton adding machine having my invention mounted thereon in connection with the paper feeding mechanism, and also having connections operated incidentally to the operation of the adding mechanism. Fig. 2 is a diagrammatic view illustrating the arrangement of the latching means whereby the line or item counting mechanism may be held in any desired relative adjustment. Fig. 3 is a front view of the paper carriage showing the connections whereby the indicating mechanism is operated incidentally to the movement of the paper, or incidentally to the actuation of the adding mechanism. Fig. 4 is a plan view of the invention. Fig. 5 is a side elevation, with parts of the signal disk removed. Fig. 6 is a sectional view on the line 6—6 of Fig. 5. Figs. 7, 8 and 9 are sectional views on the lines 7—7, 8—8, and 9—9, respectively, of Fig. 6 looking in the direction designated by the arrows on said section lines. Fig. 10 is a view of the latch bolt support, and the latch bolts mounted thereon. Fig. 11 is a view of the keeper member which coöperates with the latch bolts in holding the indicating and signal mechanism in its various adjustments. Fig. 12 is a perspective view of the actuator and the detainer which coöperate with the indicating and signaling mechanism to control said mechanism incidentally to the movement of the paper in line spacing, and also incidentally to adding operations.

The Dalton adding and listing machine, with which, for purposes of convenience, I have chosen to illustrate my invention is illustrated and described in Hopkins' Patent No. 1,039,130, dated September 24, 1912. This machine includes a series of adding wheels 1, and a series of actuating racks 2 for actuating the adding wheels in adding operation. Operation of the actuating racks 2 is controlled by the swinging arms 3 pivotally supported upon a shaft 4ª, from which the racks are also suspended. In adding operations the racks, which are controlled by the arms 3 are reciprocated forwardly and rearwardly, and incidentally to their reciprocation the adding wheels 1 are operated to add the numbers to which the movements of the racks correspond. The reciprocation of the racks 2 is accompanied by forward and backward movement of the arms 3, so that there is a forward and backward movement of the arms 3 for each item which is introduced into the adding wheels 1 through the movement of the racks 2. The numbers may be recorded upon paper by type mounted upon the type-carriers 4 which reciprocate with the racks 2. The type on the type-carriers is driven to record by the type-driving hammers 5 which operate automatically after the type has been positioned at the writing line, but the action of the type-driving hammers may be prevented or interrupted by moving a swinging plate 6 into the path of movement of the hammers to receive the blow of the hammers and prevent the hammers from striking the type.

In the Dalton adding machine, and in the machine of the said Hopkins patent, the paper is fed to the recording type by a revoluble platen 7 and suitable coöperating feed rolls 8. As previously explained the movement of the actuating racks 2 and of the type-carriers 4 is accompanied by movement of the arms 3 which reciprocate a link 9. The forward end of the link 9 is connected to a rod 10 which is supported in notches in the upper ends of pivoted arms 11, and which is also in a notch in the lower end of an arm 12 attached to a rockable rod or shaft 13 supported in the paper carriage. From the foregoing it is apparent that when any number is added or recorded the rod or shaft 13 is rocked as an incident to the adding or recording operations. The rod or shaft 13 operates known connections 14 for rotating the platen 7 at each rocking operation of said rod or shaft 13, thereby moving the paper a line space after the completion of each record, or incidentally to each adding operation.

In the embodiment illustrated my present invention is associated with and operated by the connections on the arms 3, including the link 9, and the rocking rod or shaft associated with said link 9. A bracket 15 is attached to one end of the paper carriage, and supports an axial stud or shaft 16 (Fig. 6), upon which is revolubly mounted a disk 17 supporting an annular flange 18. A drum or casing 19 is attached to the disk 17. A spring 20 is incased within the drum or casing 19, and has one end in engagement with said drum or casing, and the other end in engagement with the stud or shaft 16 (Fig. 9). The spring 20 is tensioned by the rotation of the elements 17, 18 and 19, which rotation is effected incidentally to the adding of numbers and to the listing of numbers as will hereinafter appear. When said parts are released, the spring 20 having been tensioned by operation of said parts as aforesaid, operates automatically to restore or return said parts to their initial position. Rotation of the member 17—18 is limited by a stud or abutment 22 on the bracket 15, so that the said member 17—18 has a scope of movement or rotation which is slightly less than one complete revolution. The connection between the spring 20 and the drum or casing 19 is preferably a frictional engagement so that, under force, the member 17—18 may be operated without breaking the spring 20.

The member 18 is provided on its periphery with a numeral scale 23, with a notch 24 corresponding to each graduation of said scale. In the present embodiment there are one hundred and five graduations and notches, five of said notches constituting an allowance for the space occupied by the stud 21 and 22, through which the member 17—18 is prevented from moving. By this construction the said member is permitted to move one hundred complete steps or line spaces, so that any number of items or lines from one to one hundred may be recorded, or any number of items from one to one hundred may be added, and a signal given when any predetermined number of said lines have been recorded, or when any predetermined number of said items have been added. The normal or idle position, that is the starting position, of the member 17—18 is illustrated in Fig. 4 in which the graduation-notch designated by "0" is opposite an index pointer 25 attached to the bracket member 15, and in operation of adding or recording the said member 17—18 moves or rotates in the direction of the arrow in Fig. 4.

A lever 26 is pivoted upon the axial stud or shaft 16, and has a notch 27 in its lower end (Fig. 5) which receives crank member 28 on the end of the rocking rod or shaft 13. By this connection the lever 26 is operated at each line space movement of the paper, and also at each item addition irrespective of the movement of the paper when the device is used in connection with an adding machine. The upper end of the lever 26 supports a pawl 29 which operates in engagement with the notches 24 to effect rotation of the member 17—18 when the lever 26 is operated as aforesaid. A spring 30 may be used to connect the pawl 29 with the bracket 15, in order to impart the necessary pressure to the pawl and cause said pawl to engage in the notches 24. A retaining pawl or detent 31 is pivoted to the bracket 15 and also engages the notches 24 to prevent the spring 20 from returning the member 17—18 to idle position, and hold said member 17—18 in the position to which it is moved by operation of the pawl 29. Both pawls may be disengaged from the notches 24, to permit the spring 20 to return the member 17—18 to its idle position or starting point, by a lever 32 which controls a pin 33 projecting under both pawls, so that movement of said lever 32 to the left, for instance, as illustrated in Fig. 5, will disengage both pawls from said notches 24.

The dial and indicating device, including the numeral scale 23, is associated and arranged to coöperate with a signal which is adjustable to attract the attention of the operator when a predetermined number of lines have been recorded in recording operations, or when a predetermined number of items have been added in adding operations.

A disk or sleeve 34 is loosely mounted upon the stud or shaft 16, and a spring 35 (Fig. 6) encircles said stud or shaft 16 between said disk or sleeve 34 and a head or flange on the outer end of the stud or shaft 16. The disk or sleeve 34 has a series of recesses in which are mounted latch bolts or pins 36 which are adapted to project through openings beyond the inner end or face of the disk or sleeve 34. A casing 37 incloses the end of the stud or shaft 16 and is in rigid engagement with the disk or sleeve 34. Coil springs 38 are interposed between the case 37 and the ends of the latch bolts or pins 36, so that said bolts or pins are under constant spring pressure. A disk 39 it attached to the stud or shaft 16 and is provided with an annular series of holes or recesses 40, (Fig. 11) adapted to receive the protruding ends of the bolts or pins 36. In the embodiment shown there are twenty-one of the holes 40, and there are five of the bolts or pins 36.

Each of the bolts or pins is adapted to latch the disk or sleeve 34 in a number of different adjustments, corresponding to the number of holes 40; so that in the embodiment illustrated each pin is capable of latching the parts in twenty-one different adjustments. Therefore, since there are five pins, and twenty-one holes, the parts may be latched in any one of one hundred and five different positions, at the will of the operator. This elastic or variable adjustment is rendered possible by the relative arrangement of the pins and the holes, which arrangement is diagrammatically illustrated in Fig. 2. In said Fig. 2 the face of the disk 34 is illustrated in projected arrangement, and in proper relation thereto, the face of the disk 39 is also illustrated in projected arrangement. As illustrated in said Fig. 2 the pin A is in position to engage within one of the holes 40. It is only necessary to move the disk 34 a distance corresponding to one fifth of the distance between two adjacent holes 40 in order to permit the pin B to engage within one of the holes 40, in which adjustment all other pins 36 will be in engagement with the face only of the disk 39. This movement, which equals one fifth of the distance between two adjacent holes 40, equals one space or step of the member 18; that is to say, it equals the distance between two adjacent notches 24 on said dial member. Each successive movement of the disk 34, for a distance equal to one fifth of the distance between two adjacent holes 40 will permit the pins C, D and E respectively, to engage within the holes 40, so that there may be as many adjustments as equals the number of holes multiplied by the number of pins. I have illustrated twenty one holes and five pins, so that there are one hundred and five possible adjustments. However, it will be readily understood that the number of possible adjustments may be varied to meet the different requirements, simply by changing the proportionate number of holes and pins, and I do not restrict myself to any specific number of possible adjustments.

The end of the case 37 is provided with a projecting portion 41, with a knob 42 whereby the case 37 and the disk 34 may be manually withdrawn to compress the spring 35 and release the latch bolts or pins 36 from engagement in the holes 40; such release or disengagement of the latch bolts or pins permits the disk 34 to be turned to any of the possible adjustments thereof, and when adjusted to the desired position the knob 42 may be released, whereupon the spring 35 actuates the disk 34 against the face of the disk 39 and engages one of the latch bolts or pins 36 within one of the holes 40, there being, in the present embodiment, one hundred and five of such possible adjustments as above explained.

In the present embodiment the knob 42 is engaged with a signal device 43, in the form of a bell-disk of approximately the same diameter as the member 18, and provided on its periphery with a graduated number scale 44 corresponding to the graduated scale 23 and the notches 24. The pointer 24 is coordinately related to a pointer 45, said two pointers being in alinement with each other, the pointer 45 coöperating with the scale 44 in the same manner that the pointer 25 cooperates with the scale 23. The member 19 supports a projection 46 upon which is pivoted a lever 47 provided with a curved arm 48 having a hammer or striker 49 upon its free end. The projection 46 extends into the bell-disk 43, so that the hammer or striker 49, when operated, will strike the bell-disk, thereby constituting a signal to the operator that the paper has moved through a predetermined number of line spaces, or that a predetermined number of items have been added. The lever 47 has pin-and-slot connection with an arm 50 which is also pivotally supported by the projection 46. The pin 51 on the lever projects through the slot in the lever 47 and is connected with a pin 52 on said lever 47 by a small spring 53, thereby holding the parts in such relation to each other that the pin 51 is normally seated in the outer end of the slot in the lever 47 (Fig. 7). A spring 54 connects the pin 52 with a stud 55 rigid with the member 17, and is effective to actuate the striker or hammer 47 toward the bell-disk 43. Movement of the parts by the spring 54 is limited by a pin 56 extending from the member 17 into the path of movement of the lever 47. The bell-disk 43 supports an arm 57 provided on its outer end with a blade 58 which is tangential to an arc whose center is the axis upon which the member 17—18 revolves. A projection 59 (Fig. 8) on the lever 50, during the revolution of the member 17—18 passes upon the outer surface of the blade 58 in the direction of the arrow 60 and thereby moves the levers 47 and 50 outwardly against the tension of the spring 54, and moves the striker or hammer 49 inwardly. The projection 59 eventually passes beyond the outer edge of the blade 58, whereupon the spring 54 retracts, causing the hammer or striker 49 to strike the inner surface of the bell-disk and thereby signal the operator.

When the bell-disk 43 is adjusted to position the "0" opposite the pointer 45, and the scale 23 is in its idle adjustment with the "0" opposite the pointer 25, the projection 59 and blade 58 are in substantially the position illustrated in Fig. 8, which will permit the member 17—18 approximately to complete an entire revolution before the projection 59 engages the blade 58. In the embodiment illustrated the paper may be fed the distance of one hundred line spaces, the extra five spaces being discounted by the space occupied by the abutments 21 and 22.

After the paper has been moved the one hundred line spaces in recording operations or after one hundred items have been added in adding operations, the projection 50 passes from upon the blade 58 and sounds the signal. By adjusting and latching the bell-disk in the position in which "10", for instance, is opposite the pointer 45 the paper may be moved ten line spaces in recording operations, or ten items may be added in adding operations, before the signal will be given. Therefore, assuming that "0" on the scale 23 is opposite the pointer 25 the paper will be moved a number of line spaces corresponding to the number on the scale 44 which is opposite the pointer 45 before the signal is given, in recording operations or a like number of items may be added before the signal is given in adding operations.

From the foregoing it will be understood that the invention is applicable in connection with recording mechanisms and in connection with adding mechanisms, and that the signal device is elastic or flexible in its adjustments, within a wide scope of work.

I am aware that there may be many variations and modifications in the construction and arrangement of the various parts of the invention without departure from the spirit and scope and principles of the invention. I do not restrict myself to identical features, but

What I claim and desire to secure by Letters Patent of the United States is:

1. In an adding machine, an item counting device comprising a support, a numeral scale on said support, a second numeral scale, a latching device whereby said second numeral scale may be held in any desired relation to the first named numeral scale, a signaling element, means for operating said support to move said signaling element, and means carried by said second numeral scale for causing said signaling element to signal.

2. In an adding machine, an item counting device comprising a support, a numeral scale on said support, a second numeral scale adjustable with respect to the first one, a latching device whereby said second numeral scale may be held in any desired adjustment with respect to the first-named scale, an actuator for holding said latching device in engagement, a signaling element, and means operated by said second numeral scale for causing said signaling element to signal.

3. In an adding machine, an item counting device comprising a support, a numeral scale on said support, an additional support, a second numeral scale on said additional support, a latching device for holding said two supports and thereby said scales in any desired relation with respect to each other, an actuator for holding said latching device in engagement, a signaling element carried by one of said supports, means for moving the support carrying said element with respect to the other support, and means carried by the other support for causing said signaling element to signal when said two numeral scales arrive at a predetermined relative position.

4. In an adding machine, an item counting device comprising an annular support, a numeral scale on said support, an additional support, a numeral scale on said additional support, a latching device whereby said additional support may be held in any desired relation to said first-named support, a signaling element carried by said first-named support, means for operating said first-named support to move said signaling elements, and means carried by said additional support for causing said signaling element to signal when said first-named scale arrives at a predetermined position with respect to said second-named scale.

5. In an adding machine, an item counting device comprising a support, a numeral scale on said support, an additional support which is adjustable with respect to said first-named support, a numeral scale on said additional support, means for retaining said additional support and the numeral scale thereon in desired relation to the first-named numeral scale, a signaling element carried by said first-named support, means for moving said first-named support and thereby said signaling element, and means carried by said additional support for causing said signaling element to signal when the numeral scale on said first-named support reaches a predetermined position with respect to the numeral scale on said additional support.

6. In an adding machine, an item counting device comprising a support, a numeral scale on said support, an additional support, a latching device for holding said additional support in any desired adjustment with respect to said first-named support, a numeral scale on said additional support, a signaling element carried by said first-named support, means for operating said first-named support, means for operating said first-named support to move said signaling element, an actuating device for said signaling element, and means carried by said additional support for causing said actuating device to operate said signaling element when said first-named support moves to a predetermined position with respect to the scale on said second-named support.

7. In an adding machine, an item counting device comprising two relatively adjustable supports, a numeral scale on each of said supports, means for moving one of said supports to any desired adjustment with respect to the other, a latching device whereby the support moved as aforesaid will be retained in a position in which it is placed, a signaling element carried by one of said supports, means for operating the support by which said signaling element is carried, and means carried by the other support in a fixed position with respect to the scale thereon for causing said signaling element to operate when the scales on said supports arrive at a predetermined position.

In witness whereof, I have signed this specification in the presence of two subscribing witnesses.

HARRY LANDSIEDEL.

Witnesses:
BRENEY DYSART,
R. D. BRYARS.

Copies of this patent may be obtained for five cents each, by addressing the "Commissioner of Patents. Washington, D. C."